(12) United States Patent
Bandstra

(10) Patent No.: US 7,104,189 B2
(45) Date of Patent: Sep. 12, 2006

(54) TWINE RESTRICTOR

(75) Inventor: Jerry E. Bandstra, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 72 days.

(21) Appl. No.: 11/023,227

(22) Filed: Dec. 27, 2004

(65) Prior Publication Data

US 2006/0137545 A1 Jun. 29, 2006

(51) Int. Cl.
*B65B 13/18* (2006.01)
*B30B 5/04* (2006.01)

(52) U.S. Cl. ............ 100/5; 100/2; 100/13; 100/88; 226/195; 56/341

(58) Field of Classification Search .......... 100/2, 100/5, 13, 88, 89; 83/950; 225/82, 83, 84, 225/85, 86, 87; 226/195; 242/419.4; 56/341
See application file for complete search history.

(56) References Cited

U.S. PATENT DOCUMENTS

| 112,501 | A | * | 3/1871 | Sargent et al. ........... 242/137.1 |
| 4,095,757 | A | * | 6/1978 | Singer ........................ 242/151 |
| 4,502,646 | A | | 3/1985 | Meiers |
| 5,215,006 | A | | 6/1993 | Jennings |
| 5,855,167 | A | | 1/1999 | Goossen |
| 6,763,761 | B1 | | 7/2004 | Smith |

* cited by examiner

*Primary Examiner*—Lowell A. Larson
*Assistant Examiner*—Jimmy T. Nguyen
(74) *Attorney, Agent, or Firm*—Sturm & Fix LLP

(57) ABSTRACT

A twine restrictor is disclosed having the advantages of simplicity and reliability. The twine restrictor is generally formed from solid or hollow stock. It is left free floating while being restrained sufficiently to avoid loss. Twine is passed over a substantially horizontal surface of a twine arm assembly and the twine restrictor is simply placed on the twine, providing a force up to a value equal to its weight on the twine. The twine restrictor is unaffixed and no springs are required.

17 Claims, 11 Drawing Sheets

TWINE RESTRICTOR

TECHNICAL FIELD

The principles disclosed relate to improvements to round balers used for harvest of agricultural crops. More particularly, the invention relates to improved reliability of a mechanism that feeds and controls twine to a formed cylindrical bale for wrapping the bale. The invention further relates to a feed mechanism configured to minimize potential negative influences related to movement of the twine during the portion of the baling cycle when the bale is being formed, while the twine is being held in position, ready to wrap the bale.

BACKGROUND

Many mechanisms have been developed for wrapping bales with filament typically referred to as twine. The twine is held in a staging position while a bale is being formed. An end of the twine is positioned to engage the moving periphery of the formed bale. This engagement pulls the twine which subsequently wraps the bale.

Restricting or tensioning devices usually comprise a spring-loaded plate, wherein the twine is held under spring tension between the plate and another surface. Adjustments are required when changing twine types and as conditions change.

Meiers, in U.S. Pat. No. 4,502,646, discloses such a twine tensioning device comprising a plate held against the twine by a spring.

U.S. Pat. No. 5,215,006 by Jennings et al. is for a twine clamp used in large round balers. The clamp is not usually used for providing tension while the twine is feeding onto the bale, but Jennings et al. disclose that the clamp could be used thus. No details are included.

There is need, therefore, for a reliable, simple twine restrictor.

SUMMARY OF THE INVENTION

An object of the present invention is to provide a twine restricting device with improved reliability for large round balers. An additional object of this invention is to provide a simple tensioning device having a minimum of moving parts. Still another object is to provide a method and apparatus for twine restricting not needing adjustment when using different styles or brands of twine.

To accomplish the aforementioned goals, twine strands are passed under a twine restrictor of a predetermined weight, to provide restriction to its travel. In an additional embodiment, the twine passes over the twine restrictor. Whether the twine passes over or under the twine restrictor, the path taken by the twine is sufficiently curved or bent so as to provide restriction to its travel.

The cross-sectional shape of the twine restrictor may be round, rectangular, octagonal, trapezoidal, or other suitable shape. The twine restrictor may be captive in a sufficiently enclosed framework so as to keep it engaged with the twine most of the time. In an additional embodiment, the twine restrictor may engage holes in the framework at the twine restrictor's ends, the holes being sufficiently large to allow the twine restrictor to be free-floating, yet held captive to avoid being lost.

For the purposes of the present disclosure, "free floating" shall be defined as unaffixed, that is, not bolted, screwed, clamped, etc. A free floating twine restrictor may be constrained so as to avoid being lost. Such a constraint may comprise an enclosure in which the twine restrictor is free floating, or the ends of the twine restrictor may engage oversized holes whereby the restrictor is constrained but free floating. In particular, a twine restrictor held in place with a bolt and spring and allowed to flex only with the spring is not free floating according to this definition.

The twine restrictor may be made from various materials and in various forms. That is, it may be made from solid steel bar stock, hollow stock, aluminum, or other materials or forms depending on the required weight. The present invention is not limited in material or form. Preferably, the twine restrictor will be made from a non-corrosive material or be coated with a plating that resists corrosion. Resistance to wear may also be an issue with some twines in some applications.

Typically, the twine restrictor of the present invention is located on an end of the twine arm assembly closest to the bale. However, the present invention is not limited to a particular location for the twine restrictor.

DETAILED DESCRIPTION

Figure 1:
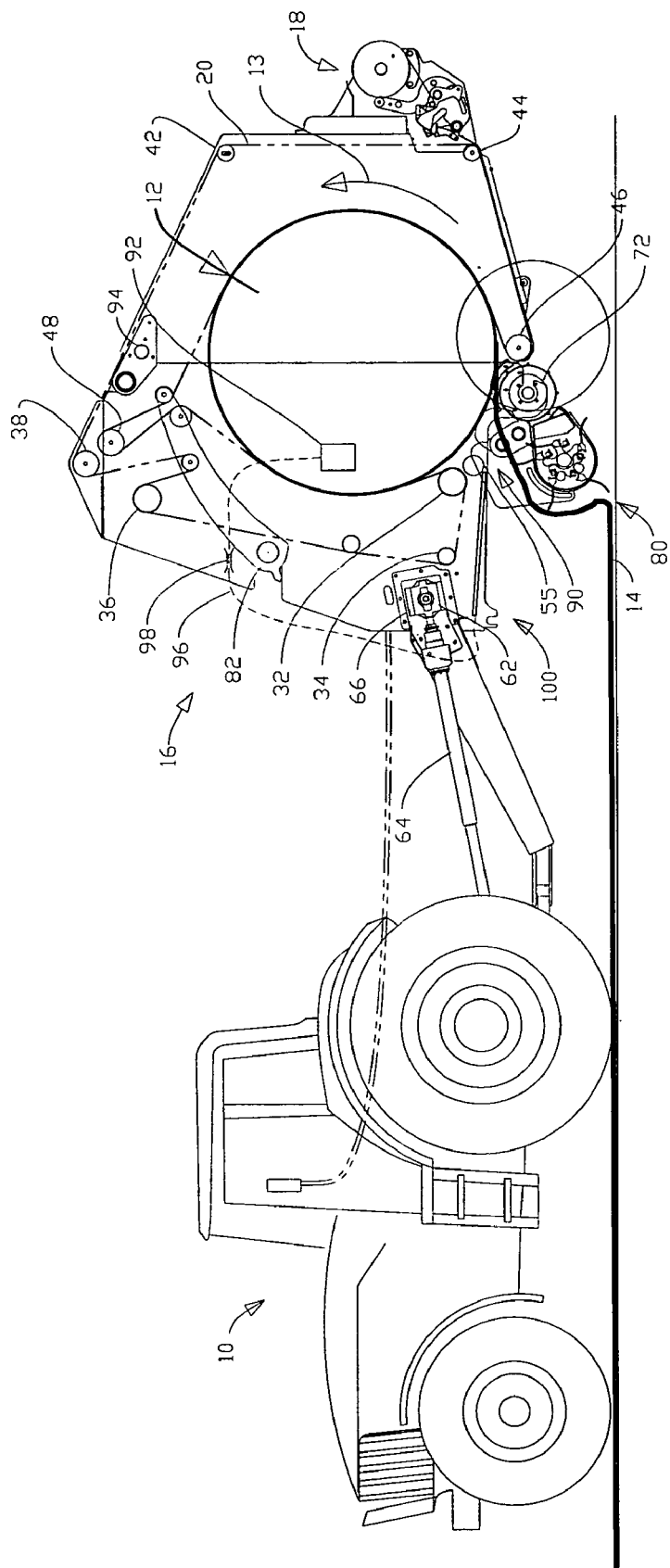
FIG. 1 is a schematic side view of a left side of a round baler.

With reference now to the various figures in which identical elements are numbered identically throughout, a description of various exemplary aspects of the present invention will now be provided. The preferred embodiments are shown in the drawings and described with the understanding that the present disclosure is to be considered an exemplification of the invention and is not intended to limit the invention to the embodiments disclosed. Any references, herein, to directions will be determined by facing in the direction of travel of the baler during normal operation.

FIG. 1 illustrates a schematic side view of the left side of one configuration of a round baler 16, known as a variable chamber baler. The baler 16 is shown with a formed bale 12, and illustrates the main functional components. In this type of baler, a number of bale forming belts 20, of a known flat configuration, typically approximately one quarter to one half inch in thickness and four to fourteen inches in width, are routed over several belt rollers in fixed positions, including the rollers 32, 34, 36, 38, 42, 44, 46 and 48. These fixed belt rollers 32, 34, 36, 38, 42, 44, 46 and 48 are supported by bearings mounted to a left side panel and to a right side panel for rotation so that the belts are able to move, rotating the forming bale 12 in the direction indicated by the arrow 13. The panels are not shown, as many configurations of the panels are well known. The side panels are spaced apart by various components including the rollers 32, 34, 36, 38, 42, 44, 46 and 48 and a tongue 66. The spacing between the side panels defines the width of the bale forming chamber and the length of the cylindrical bale 12 that that will be formed by the baler. The belts 20 are kept under tension by a belt tightener 82, so that the belts 20 define a variable-sized bale chamber.

Another type of round baler, known as a fixed chamber baler, does not include the variable size bale chamber feature, and typically includes rolling elements that are in fixed positions to define a bale chamber of a fixed diameter. The present invention is useful for either fixed or variable chamber balers.

At least one of the fixed position rollers 32, 34, 36, 38, 42, 44, 46 and 48 of the baler 16 is powered by a drive system that includes a right-angle gearbox 62 connected at its input shaft to a driveline 64. The gearbox 62 transfers power from a towing vehicle 10 through an output shaft to chains and sprockets that transfer power to the driven roller(s) and to the pickup 80, which functions to lift crop material 14 from the ground and into engagement with a roller 72, belts 20, and a starter roller 55 which cooperate to form the crop material 14 into a cylindrical bale 12 enveloped by the belts 20. The chains and sprockets are not illustrated.

Once a bale 12 has reached its desired size, a wrapping material is applied to the outer circumference of the bale 12 while still in the baler 16. After the bale 12 is thus wrapped, a tailgate, which comprises a portion of the side panels and the rollers 42, 44, and 46, will pivot around a tailgate pivot 94, allowing the finished bale 12 to drop out of the baler 16.

The known wrapping materials include either a filament, typically know as twine, made from either natural fibers or various types of plastic, and sheet-type netwrap, typically made of a type of plastic material. Twine is typically inserted into a crop inlet area 90 of the baler 16 by a mechanism 100 and applied in a spiral fashion by moving from one side panel across to the opposite side panel while the bale 16 is rotating. Sheet-type netwrap is known to be applied to the bale 16 by a netwrap mechanism 18, as described in coassigned, copending patent application U.S. Ser. No. 10/719,460, herein incorporated by reference.

Twine is stored on both sides of the baler 16, in a supply roll known as a twine ball 92, typically with more than one twine ball 92 on each side of the baler 16. The twine is routed from the twine ball 92, along the front of the baler 16 to the twine mechanism, along a path generally labeled as 96. There can be a single strand or multiple strands of twine routed from each side to the twine tie mechanism 100. The twine routing is typically defined by tubes and other guides, which are not illustrated in this disclosure, and each strand of twine passes through a tension plate 98, located near the twine ball. The tension plate 98 clamps the twine to ensure that the twine is under some tension as it passes along the path 96.

Figure 2:
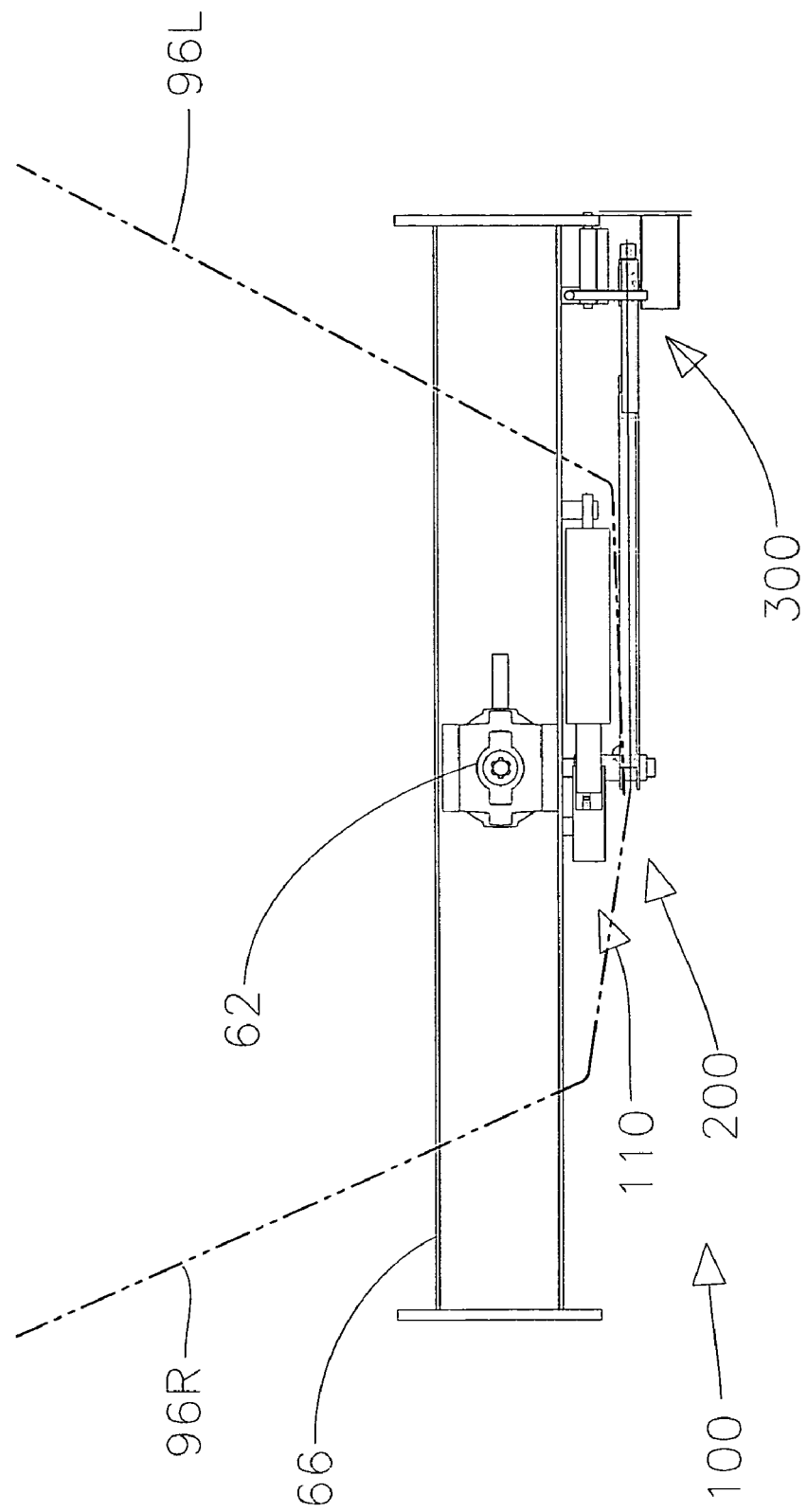
FIG. 2 is a schematic front view showing the tongue beam and twine tie of a round baler.

The twine is routed to the twine tie mechanism 100, illustrated in FIG. 2 as located beneath the tongue 66, including a drive assembly 110, a twine arm assembly 200 and twine cutter assembly 300.

Figure 3:
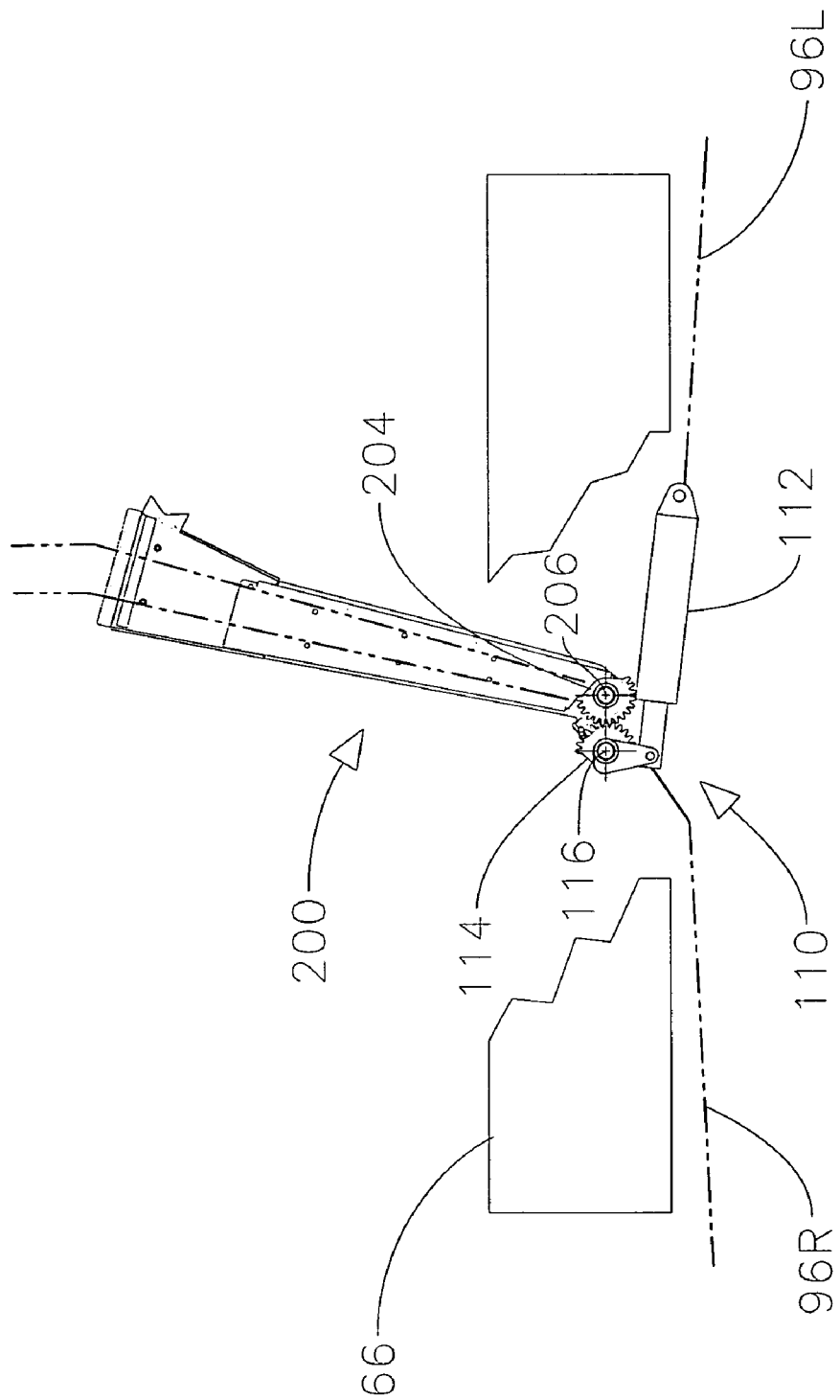
FIG. 3 is a schematic top view of the tongue and twine tie assembly in an intermediate position.
Figure 4:
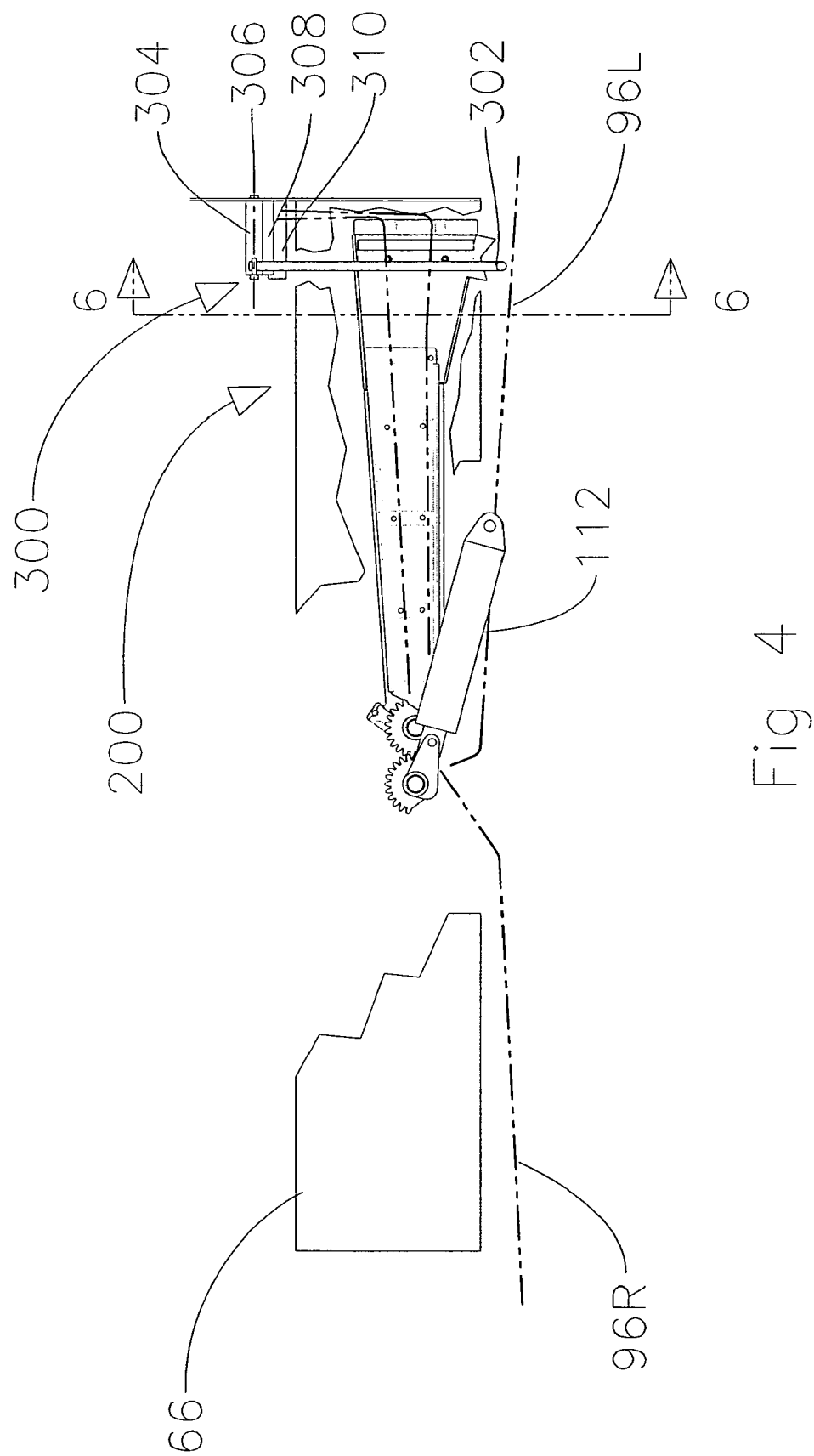
FIG. 4 is a schematic top view of the tongue and twine tie assembly in a retracted position.
Figure 5:
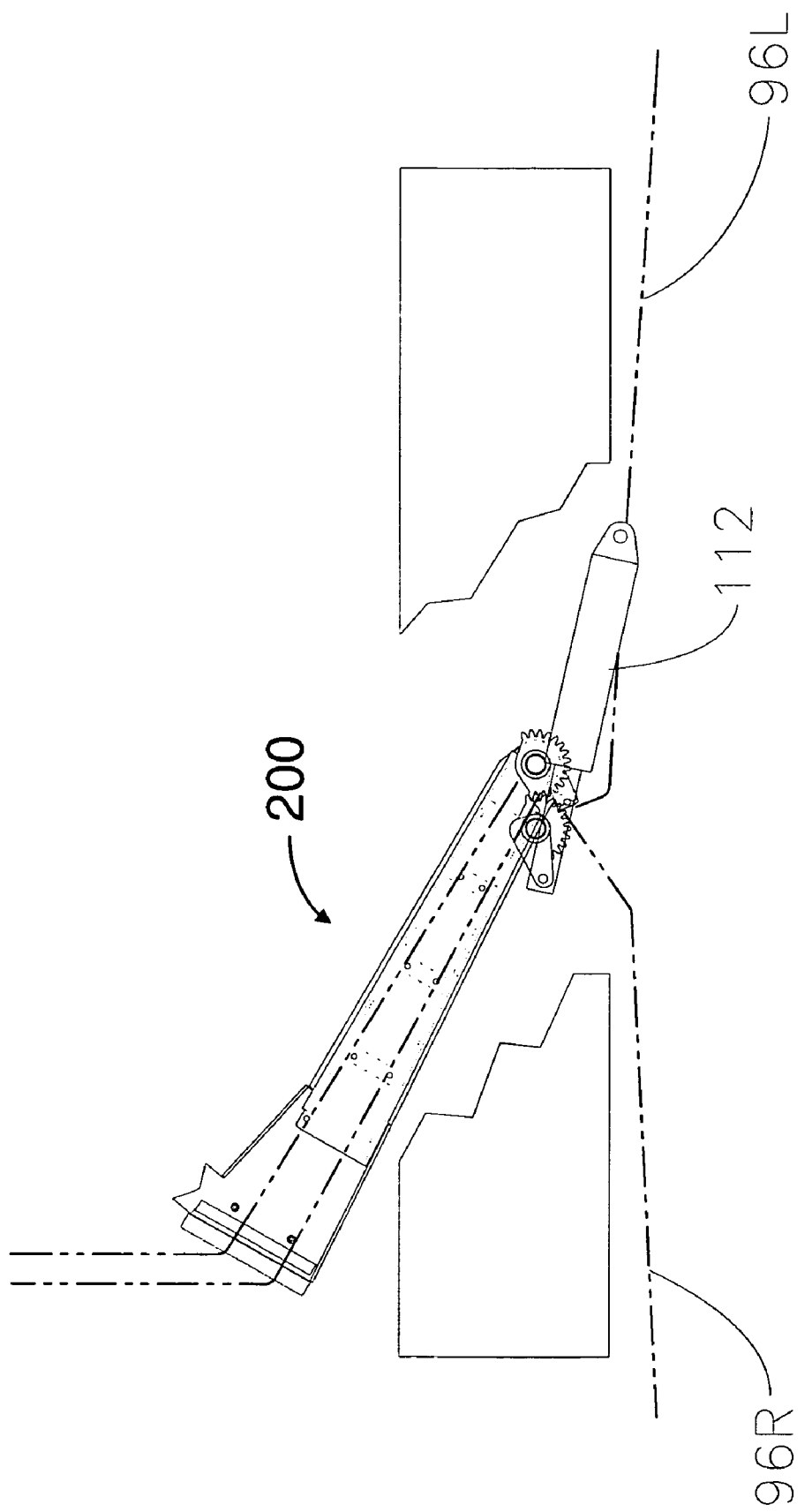
FIG. 5 is a schematic top view of the tongue and twine tie assembly in an extended position.

The drive assembly 110 can be seen in more detail in FIG. 3, with the twine arm assembly 200 in a partially extended position, to include an actuator 112 connecting to a drive gear 114 which pivots about a first axis 116. The drive gear 114 meshes with a driven gear 204, which pivots about a second pivot axis 206. The actuator 112 can extend to rotate the twine arm assembly 200 counter-clockwise, toward a fully extended position as illustrated in FIG. 5, or retract to rotate the twine arm assembly 200 clockwise towards the fully retracted position as illustrated in FIG. 4. In the fully retracted position the twine arm assembly 200 is positioned beneath the tongue 66, cut-away in FIG. 4 to better illustrate the twine cutter assembly 300 including a link 302, a bracket 304 pivoting about an axis 306, a twine knife 308, and a reaction bracket 310.

Figure 6A:
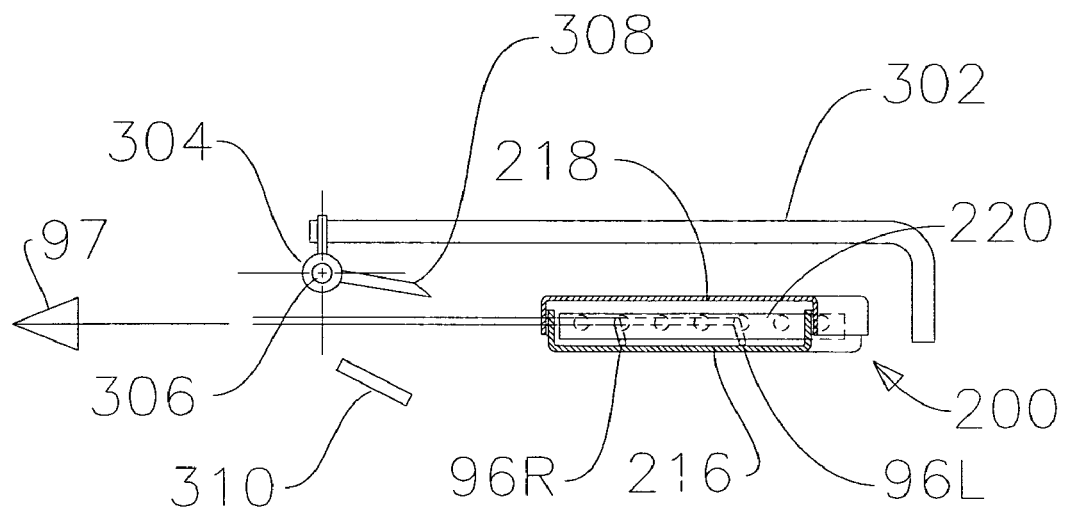
FIG. 6a is a cross-section taken along 6—6 identified in FIG. 4.
Figure 6B:
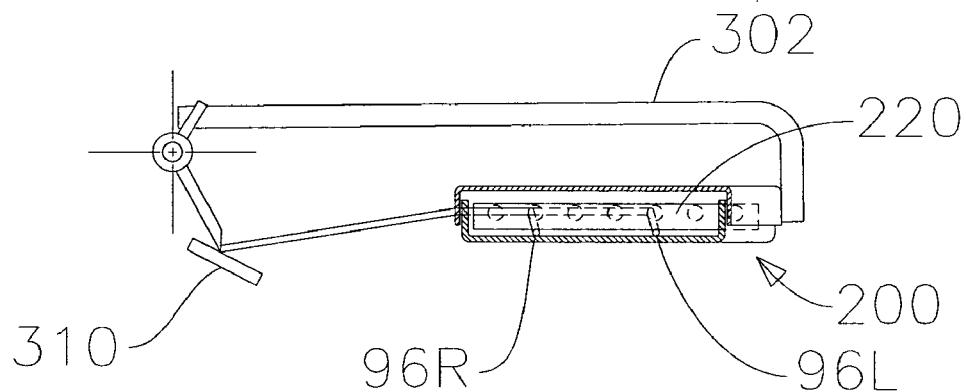
FIG. 6b is a cross-section taken along 6—6 identified in FIG. 4.

FIGS. 6a and 6b illustrate the twine arm assembly 200 and twine cutters of the present invention in more detail, with the twine arm assembly 200 in a position with the strands of twine 96L and 96R being pulled in a direction 97 by the bale in FIG. 6a. As the twine tie cycle reaches the end of the cycle the twine arm assembly 200 will move from left to right to a position where the twine is cut as shown in FIG. 6b, as happens when the twine arm assembly 200 activates the rod 302 which rotates the twine knife 308 into the path of the twine, pressing it against the reaction bracket 310 to guarantee the twine is cut.

Figure 7:
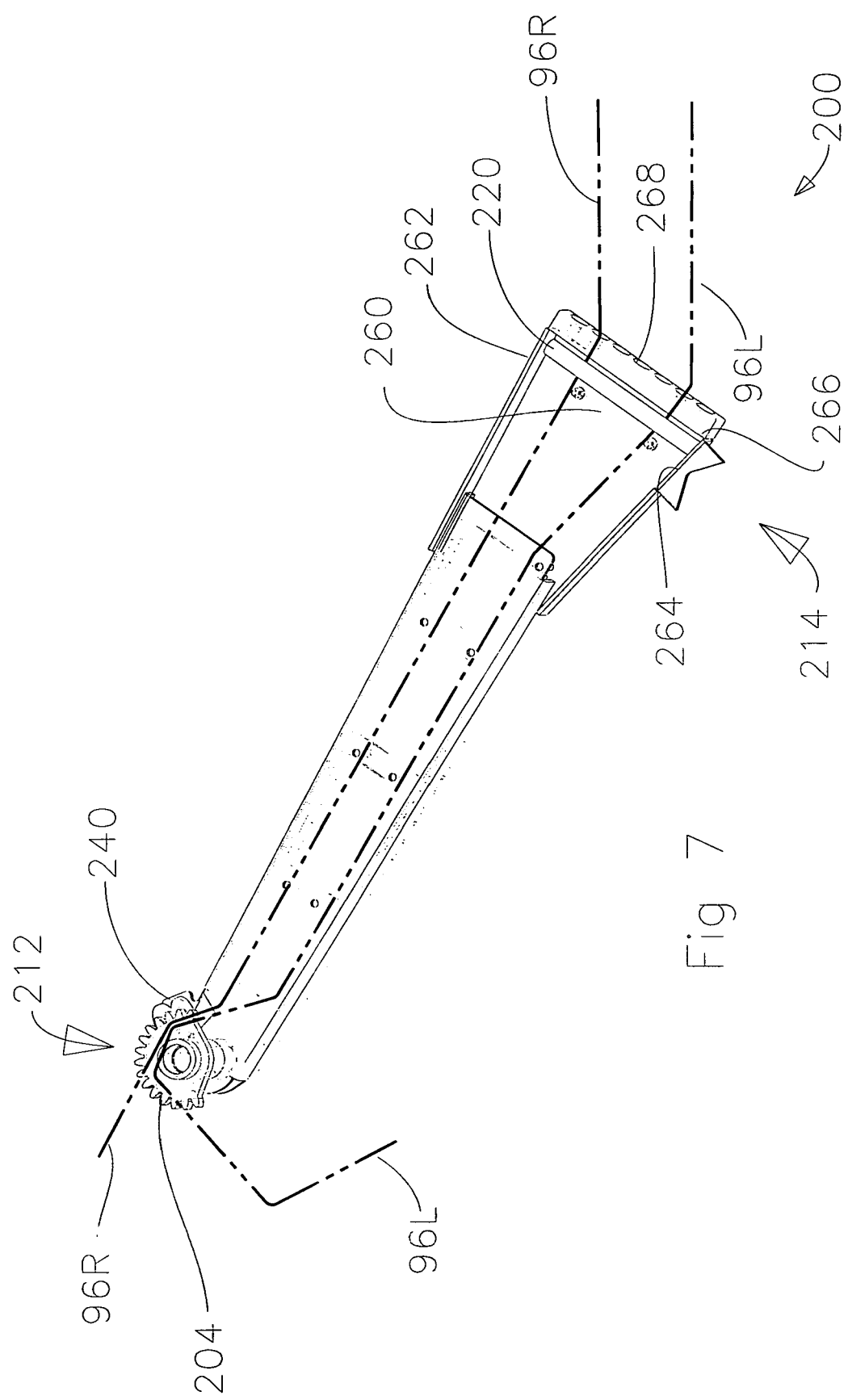
FIG. 7 is an isometric view of the twine arm assembly of the present invention with two strands of twine.

FIGS. 6a and 6b further illustrate the twine arm assembly 200 of the present invention to include a twine restrictor 220, which is constructed of a round bar. The restrictor 220 is shown on top of the strands of twine 96L and 96R. FIG. 7 further illustrates a right-side twine strand 96R and left-side twine strand 96L passing from a twine guide 240, illustrated as a porcelain insulator, at a twine entry end 212, near the driven gear 204, to an exit end 214. Each strand of twine 96L and 96R is selectively located in one of several alternative apertures in a guide block 268 at the exit end 214, allowing control of the spacing between the strands of twine 96L, 96R as it is installed on the baler 16.

Figure 16:
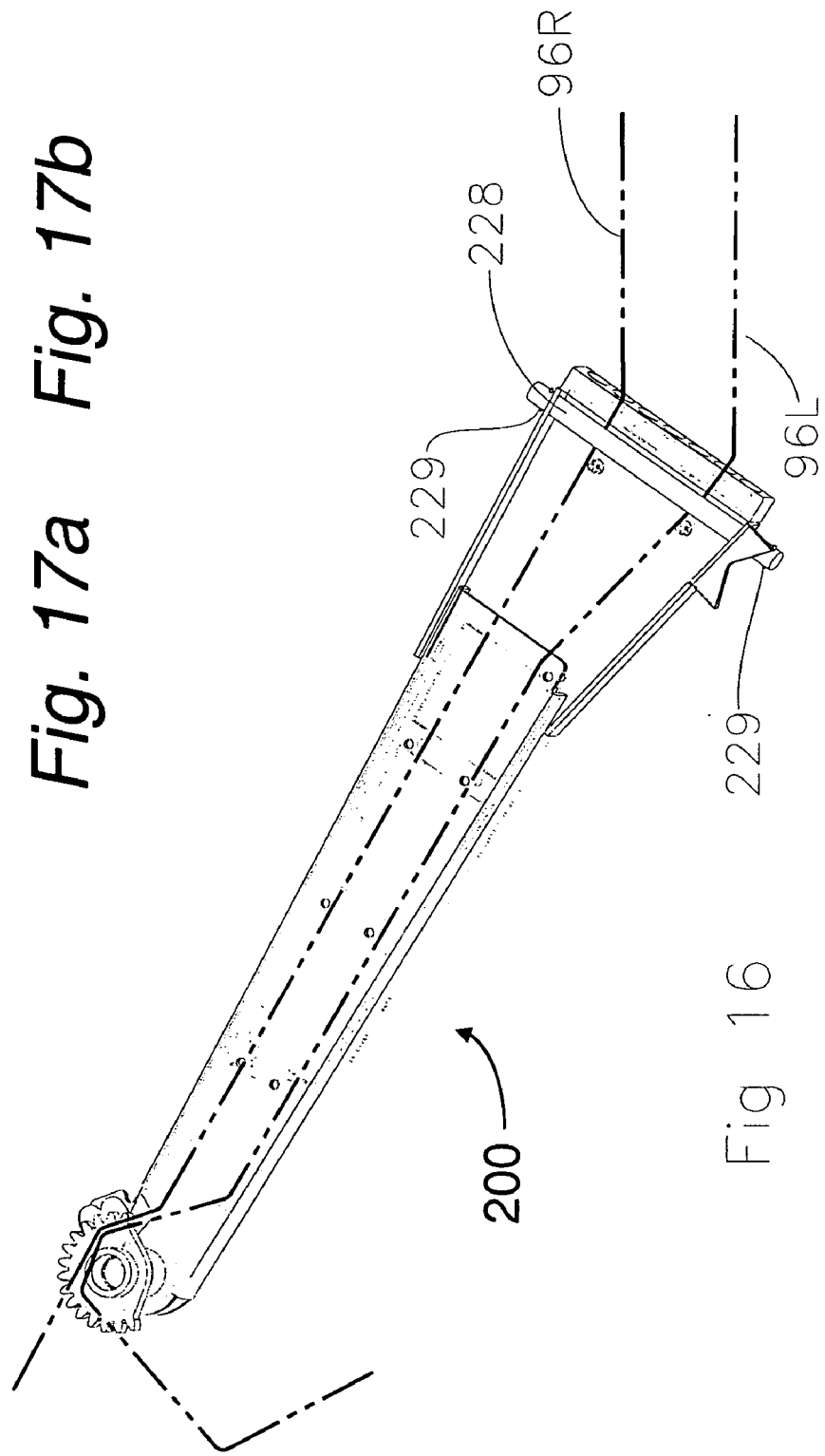
FIG. 16 is an isometric view of the twine arm assembly of the present invention with an additional embodiment of the twine restrictor.

Each strand of twine 96L and 96R passes under a restrictor 220 that is located near the exit end 214. The twine arm assembly 200 is constructed in two parts; a bottom U-shaped channel 216, and a top U-shaped cover 218, as shown in FIG. 6a. To initially route the twine strands through the twine arm assembly 200, preparing it to wrap a bale 12, the top cover 218 is removed by the operator, and the twine strands routed from the twine entry end 212 to the exit end 214, while the twine restrictor 220 is removed with the cover 218. The operator will position the twine strands 96R, 96L to extend beyond the end of the twine arm assembly 200 to ensure proper (reliable) operation. Once the twine is properly positioned, the twine restrictor 220 is installed on top of the twine strands 96R, 96L, as illustrated in FIG. 7, with the cover 218 still removed. The twine restrictor 220 is supported by the top surface 260 of the U-channel 216 while being retained in that position by the sides 262, 264 and a front side 266, which is formed by the guide block 268. The cover plate 218 will be secured to the U-channel 216, as illustrated in FIG. 6a, to hold the twine restrictor 220 in place. FIG. 16 illustrates an alternate embodiment where the twine restrictor 228 is longer than the width of the U-channel, and passes through oversized slots while roll pins 229 retain the twine restrictor 228 to the twine arm assembly 200, even with the cover 128 removed. The apertures in the sides of the U-channel, not shown, will be sized such that the weight of the restrictor 228 is supported by the top surface 260, or strands of twine 96R, 96L. The twine restrictor 228, bearing on top of the twine strands, minimizes the possibility of undesirable movement of the twine strands, while the twine arm assembly 200 is held in the position under the tongue 66, as shown in FIG. 4, while a bale 12 is being formed.

Once the bale 12 is formed, the twine arm assembly 200 is rotated, moving the exit end 214 towards the formed bale 12, to initiate the wrapping process. As the exit end 214 reaches the formed bale 12, the twine strands 96R, 96L that extend from the twine arm assembly 200 will be pulled into the baler 16. The twine strands 96R, 96L will then be moving rapidly, causing the twine restrictor 200 to roll, while twine is being pulled from the supply balls 92 and through the twine tension plates 98. At the end of the twine cycle the twine arm assembly 200 will be rotated to the position illustrated in FIG. 6b, where the twine 96R, 96L will be cut. The restrictor 220 of the present invention will restrict the twine's 96R, 96L tendency to snap back as the tension in the twine 96R, 96L is suddenly eliminated after it is cut. It will also again minimize the possibility of undesirable movement of the twine strands 96R, 96L, while the twine arm assembly 200 is held in the position under the tongue 66.

Figure 8:
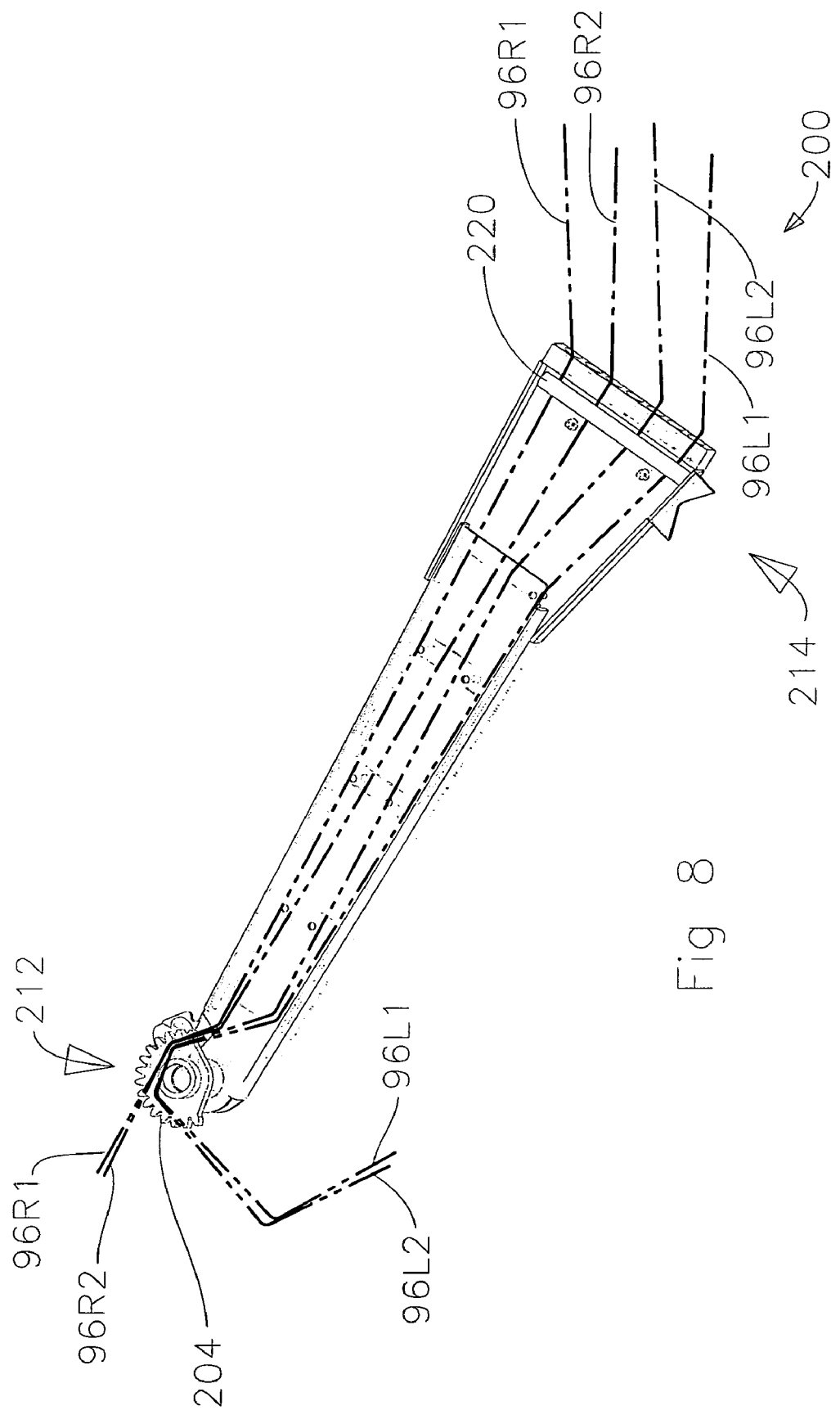
FIG. 8 is an isometric view of the twine arm assembly of the present invention with four strands of twine.

In this manner the single element, twine restrictor 220, is able to hold more than one strand of twine. FIG. 8 illustrates the twine arm assembly 200 with four strands of twine, as would be possible by routing two strands 96L1 and 96L2 from the left side and two strands 96R1 and 96R2 from the right side.

Figure 9:
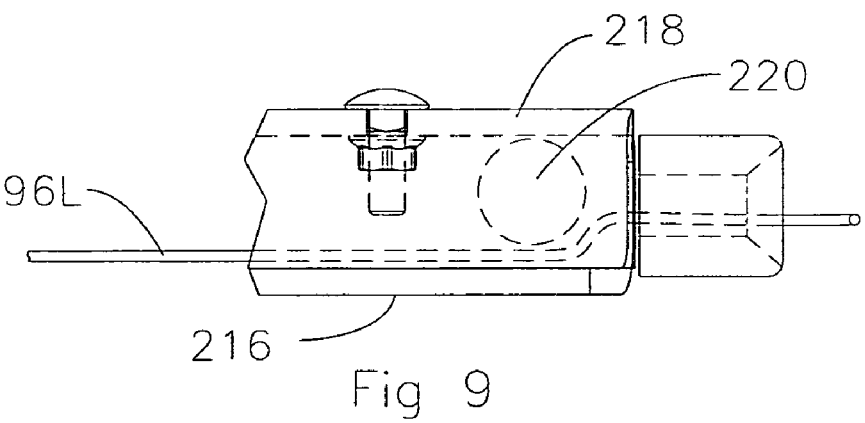
FIG. 9 is a side elevation view of the exit end of the twine arm assembly showing a twine restrictor.
Figure 10:
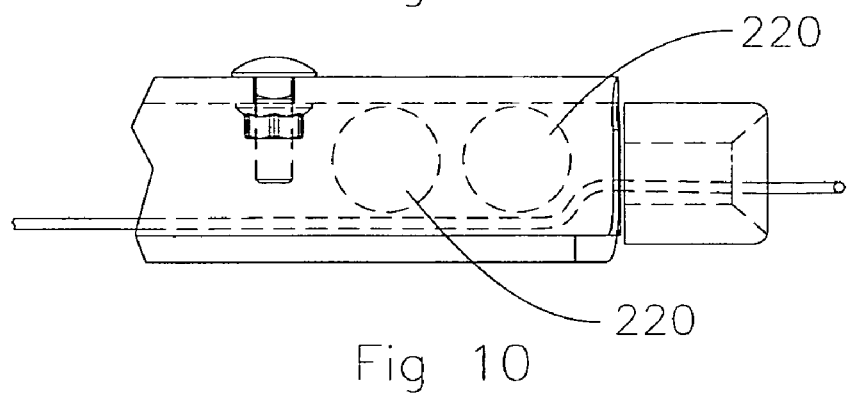
FIG. 10 is a side elevation view of the exit end of the twine arm assembly showing two twine restrictors.
Figure 11:
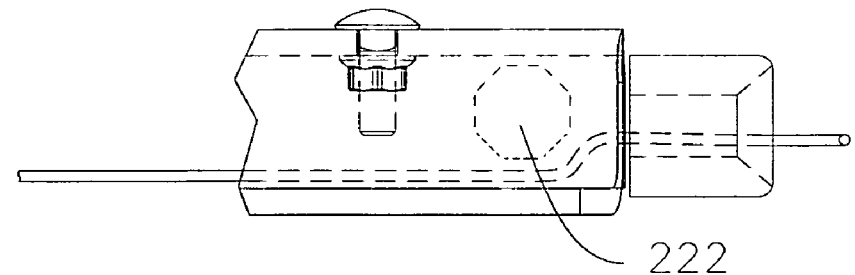
FIG. 11 is a side elevation view of the exit end of the twine arm assembly showing a twine restrictor having an octagonal cross-section.
Figure 12:
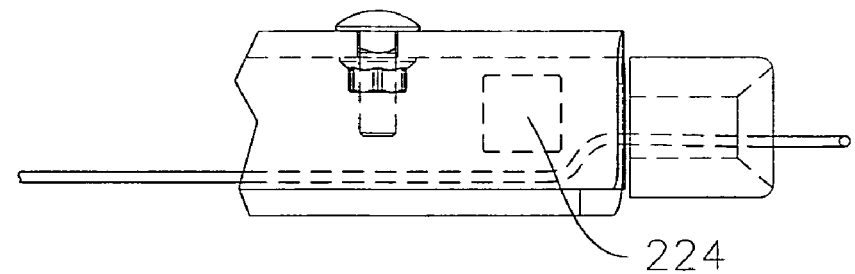
FIG. 12 is a side elevation view of the exit end of the twine arm assembly showing a twine restrictor having a rectangular cross-section.
Figure 13:
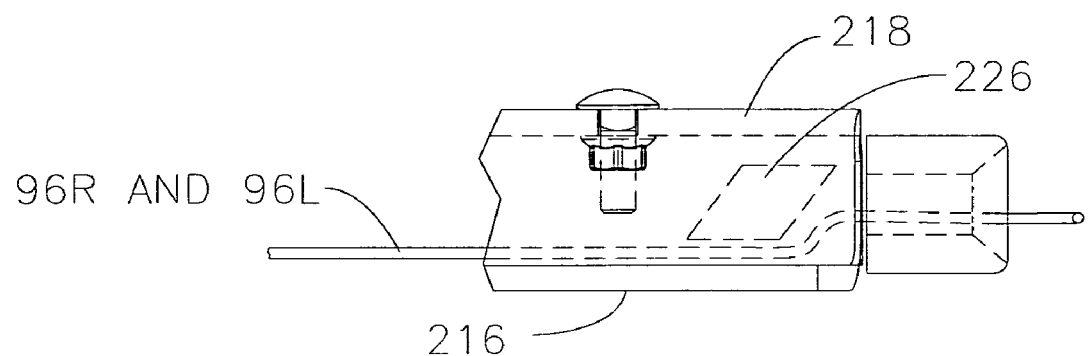
FIG. 13 is a side elevation view of the exit end of the twine arm assembly showing a twine restrictor having a trapezoidal cross-section in a first orientation.
Figure 14:
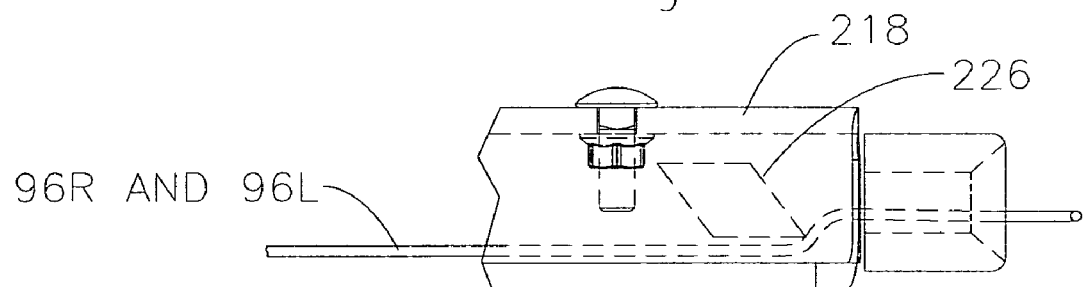
FIG. 14 is a side elevation view of the exit end of the twine arm assembly showing a twine restrictor having a trapezoidal cross-section in a second orientation.
Figure 15:
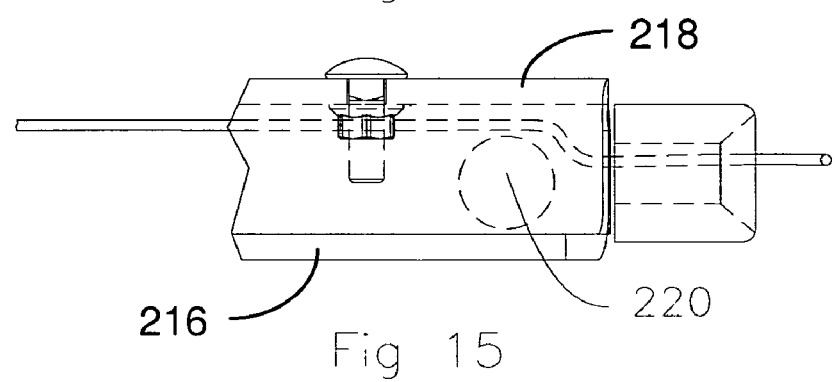
FIG. 15 is a side elevation view of the exit end of the twine arm assembly showing a twine restrictor residing beneath the twine.

FIG. 9 illustrates a detailed side view of the exit end 214 of the twine arm assembly 200 with the bottom U-Shaped channel 216 supporting the twine restrictor 220, positioned on top of the twine strands 96L and 96R. If the twine is not being pulled into the baler 16, the weight of the twine restrictor 220 traps the twine and holds it in position. As the twine arm assembly 200 is extended into the baler 16, to introduce the strand of twine so that the twine is pulled into the bale 12 in order to wrap the bale 12, the twine restrictor 220 will continue to bear on the twine strands. As the twine moves, the roller will rotate, causing little drag. If a single twine restrictor 220 is not sufficient to hold the twine strands 96R, 96L, then a plurality of twine restrictors 220 may be utilized, as illustrated in FIG. 10. Other options are shown in FIG. 11, where the twine restrictor 222 is constructed from a shaft with an octagonal cross-section, and FIG. 12 with a square cross section 224. FIGS. 13 and 14 illustrate restrictors 226 with trapezoidal cross-sections, providing a certain restriction to twine movement when installed in a first orientation as shown in FIG. 13, and a different restriction when installed in a second orientation as shown in FIG. 14. In certain cases, the system may function best when there is no added restriction, in which case the system of the present invention can easily be adapted as illustrated in FIG. 15, with the twine being routed on top of the restrictor 220. The appropriate cross-section, or orientation of the twine restrictor and twine can be selected to provide a desired restriction to the movement of the twine strands 96L and 96R.

Figures 17A, 17B:
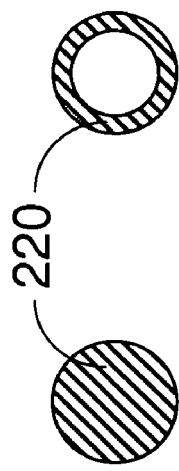
FIG. 17a is a cross-sectional view of a cylindrical twine restrictor made from solid bar-stock.
FIG. 17b is a cross-sectional view of a cylindrical twine restrictor made from hollow stock.

FIGS. 17a and 17b illustrate cross sections of twine restrictors 220 to show that the twine restrictors 220 may be fashioned from solid (FIG. 17a) or hollow (FIG. 17b) stock depending on weight requirements. Any of the embodiments of twine restrictors 220, 222, 224, 226, 228 shown herein may be constructed of solid or hollow stock. The present invention is not limited to a particular material from which the twine restrictor 220 is made.

With regard to the forgoing description, it is to be understood that changes may be made in detail, especially in matters of the construction materials employed and the size, shape and arrangement of the parts without departing from the scope of the present invention. The true scope and spirit of the invention are indicated by the broad meaning of the following claims.

The invention claimed is:

1. A large round baler having a bale forming chamber, where crop material is rotated and compressed to form a cylindrical bale, and a twine arm assembly to guide a strand of twine to the rotating bale and to move the twine strand longitudinally as the bale is rotated in order to apply the strand in a spiral pattern wherein the twine arm assembly comprises:

a first end with a twine guide;

a second end with a twine guide;

a middle section including a flat, generally horizontal surface, first second and third sides;

a twine restrictor that is guided by the sides of the middle section such that the twine restrictor is retained, but not restrained; and where the twine restrictor is supported by the flat surface of the middle section such that its weight will be supported by twine that passes from the first end to the second end and under the twine restrictor.

2. A method of restricting twine in a large round baler being generally used to form crop material into a cylindrical bale such as used for livestock feed and bedding, said large round baler comprising a twine restrictor having a weight, a horizontal surface, and at least one strand of twine, said method comprising:

(a) placing the at least one strand of twine on the horizontal surface of the large round baler;

(b) placing the twine restrictor on the at least one strand of twine;

(c) applying a force to the at least one strand of twine due only to the weight of the twine restrictor; and (d) permitting said twine restrictor to be free floating.

3. The method of claim 2 including restraining movements of the twine restrictor generally in a direction parallel to a direction the at least one strand of twine is moved as it feeds onto the cylindrical bale.

4. The method of claim 2 including:

(a) enclosing the twine restrictor in an enclosure, a lower portion of the enclosure comprising the horizontal surface;

(b) passing the at least one strand of twine through said enclosure;

(c) permitting the twine restrictor to float freely within the enclosure while restricting movements of the at least one strand of twine.

5. The method of claim 2 wherein the twine restrictor comprises a length of bar stock, said method including permitting the twine restrictor to roll when the at least one strand of twine is pulled onto the cylindrical bale.

6. The method of claim 2 including permitting the twine restrictor to float freely within oversized slots through which the twine restrictor passes.

7. The method of claim 2 wherein the large round baler additionally comprises a twine arm assembly having a proximal end and a distal end relative to the cylindrical bale, the method additionally comprising locating the twine restrictor nearest the proximal end of the twine arm assembly.

8. An apparatus for restricting twine in a large round baler for rolling crop material into cylindrical bales, said bales being bound with the twine, the apparatus comprising:
(a) a substantially horizontal upper surface;
(b) at least one strand of twine for wrapping the cylindrical bale in the large round baler; and
(c) a free floating twine restrictor, operatively supported by the substantially horizontal surface and oriented to bear on the at least one strand of twine with a weight of the twine restrictor.

9. The apparatus of claim 8 additionally comprising a restraining structure in which the twine restrictor may float freely.

10. The apparatus of claim 9 wherein the restraining structure comprises an enclosure.

11. The apparatus of claim 9 wherein the restraining structure comprises:
(a) a first side;
(b) a second side;
(c) a first aperture in the first side;
(d) a second aperture in the second side;
and the twine restrictor comprises:
(e) a first insertion segment for insertion into the first aperture, said first insertion segment being sized significantly smaller than the first aperture to permit the twine restrictor to be free floating; and
(f) a second insertion segment for insertion into the second aperture, said second insertion segment being sized significantly smaller than the second aperture to permit the twine restrictor to be free floating.

12. The apparatus of claim 11 additionally comprising at least one retainer pin by which the first and second insertion segments are retained in the first and second apertures.

13. The apparatus of claim 8 wherein the twine restrictor is constructed of a form selected from the group consisting of solid bar stock and hollow stock.

14. The apparatus of claim 8 wherein the twine restrictor has a cross section selected from the group consisting of round, rectangular, octagonal, hexagonal, and trapezoidal.

15. The apparatus of claim 8 wherein the twine restrictor comprises a trapezoidal cross-sectional shape and said twine restrictor comprising means for reversing said twine restrictor with respect to a direction by which the at least one strand of twine is pulled when the cylindrical bale is wrapped.

16. The apparatus of claim 8 additionally comprising a twine arm assembly having
a proximal end and a distal end relative to the cylindrical bale and wherein the twine restrictor is located nearest the proximal end of the twine arm assembly.

17. A large round baler having a bale forming chamber, where crop material is rotated and compressed to form a cylindrical bale, and a twine arm assembly to guide a strand of twine to the rotating bale and to move the twine strand longitudinally as the bale is rotated in order to apply the strand in a spiral pattern wherein the twine arm assembly comprises:
a first end with a twine guide;
a second end with a twine guide;
a middle section including a flat, generally horizontal surface, first second and third sides;
a twine restrictor disposed between the sides of the middle section such that the twine restrictor is retained, but not restrained; and
the twine restrictor being supported by the flat surface of the middle section whereby the weight of the twine restrictor will be supported by twine that passes from the first end to the second end and under the twine restrictor.

* * * * *